United States Patent [19]
Johnson et al.

[11] Patent Number: 4,559,628
[45] Date of Patent: Dec. 17, 1985

[54] SHEAR LAYER CONTROL IN A FREE-VORTEX AERODYNAMIC WINDOW

[75] Inventors: Bruce V. Johnson, Manchester; Roy N. Guile, Wethersfield, both of Conn.

[73] Assignee: United Technologies Corporation, Hartford, Conn.

[21] Appl. No.: 488,838

[22] Filed: Apr. 26, 1983

[51] Int. Cl.$^4$ ............................................. H01S 3/08
[52] U.S. Cl. ..................................... 372/104; 330/4.3; 350/319
[58] Field of Search ..................... 372/104, 701, 103; 350/319; 330/4.3

[56] References Cited

U.S. PATENT DOCUMENTS

| | | | |
|---|---|---|---|
| 3,617,928 | 11/1971 | Hausmann | 331/94.5 |
| 3,654,569 | 4/1972 | Hausmann | 350/319 |
| 3,873,939 | 3/1975 | Guile et al. | 372/104 |
| 3,973,218 | 8/1976 | Kepler et al. | 331/94.5 C |
| 4,152,672 | 5/1979 | Hundstad | 372/82 |
| 4,207,542 | 6/1980 | Shon | 372/93 |

Primary Examiner—William L. Sikes
Assistant Examiner—Léon Scott, Jr.
Attorney, Agent, or Firm—Richard P. Lange; Robert P. Sabath

[57] ABSTRACT

A boundary-controlled aerodynamic window positioned adjacent the exit aperture of a gas laser is transparent to the laser beam emitted from the cavity of the laser. The boundary-controlled aerodynamic window is formed by a high velocity gas flow directed by a duct across the exit aperture for the laser beam isolating the low pressure region of the cavity from the high pressure of the atmosphere. The exit aperture is enlarged and an auxiliary gas flow injected along the sidewall of the duct adjacent the exit aperture to expand the thickness of the boundary layer. In a second embodiment, particulate matter is fixedly attached to the sidewall of the duct to increase the roughness of the wall surface. A third embodiment uses a plurality of nozzles, each injecting gas with a predetermined velocity.

4 Claims, 4 Drawing Figures

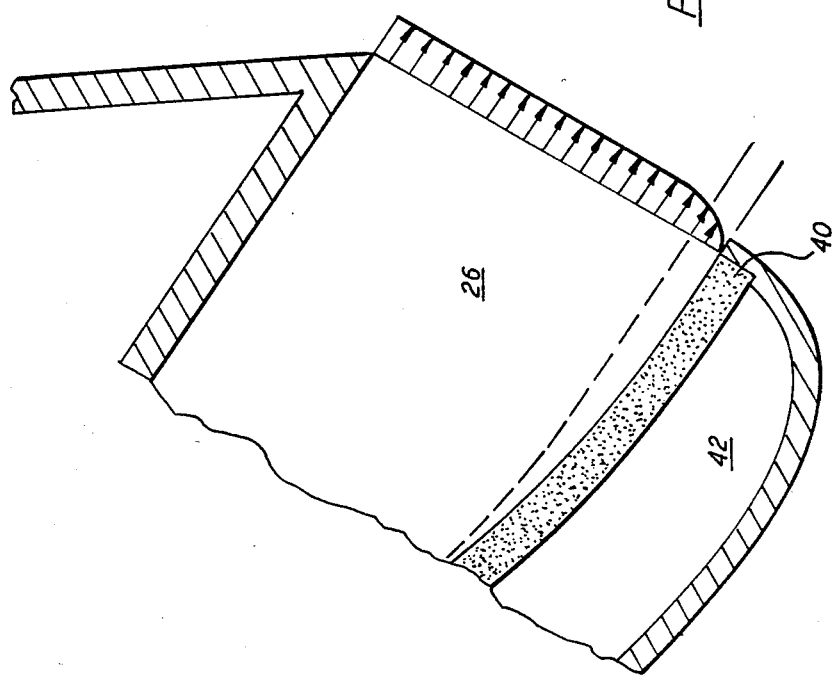

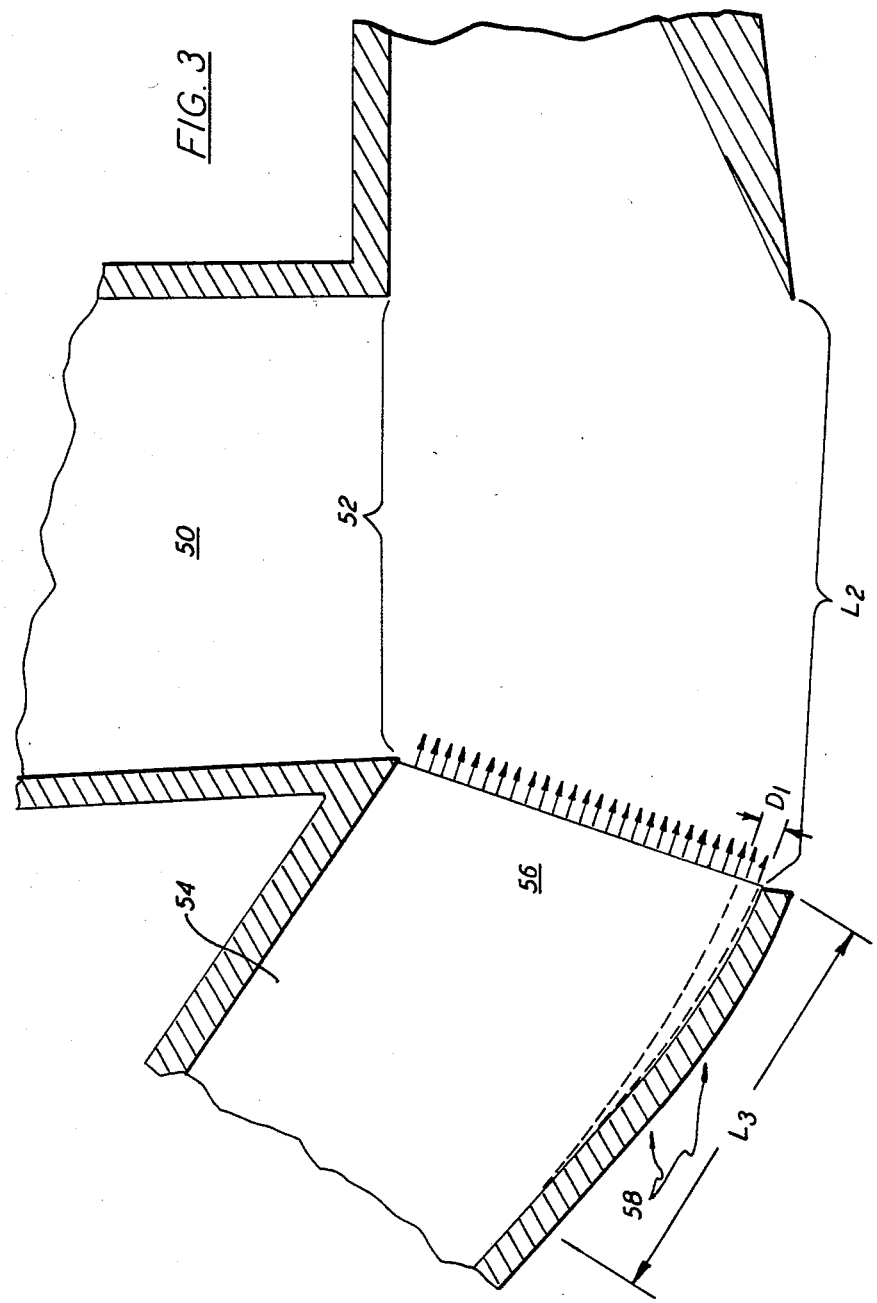

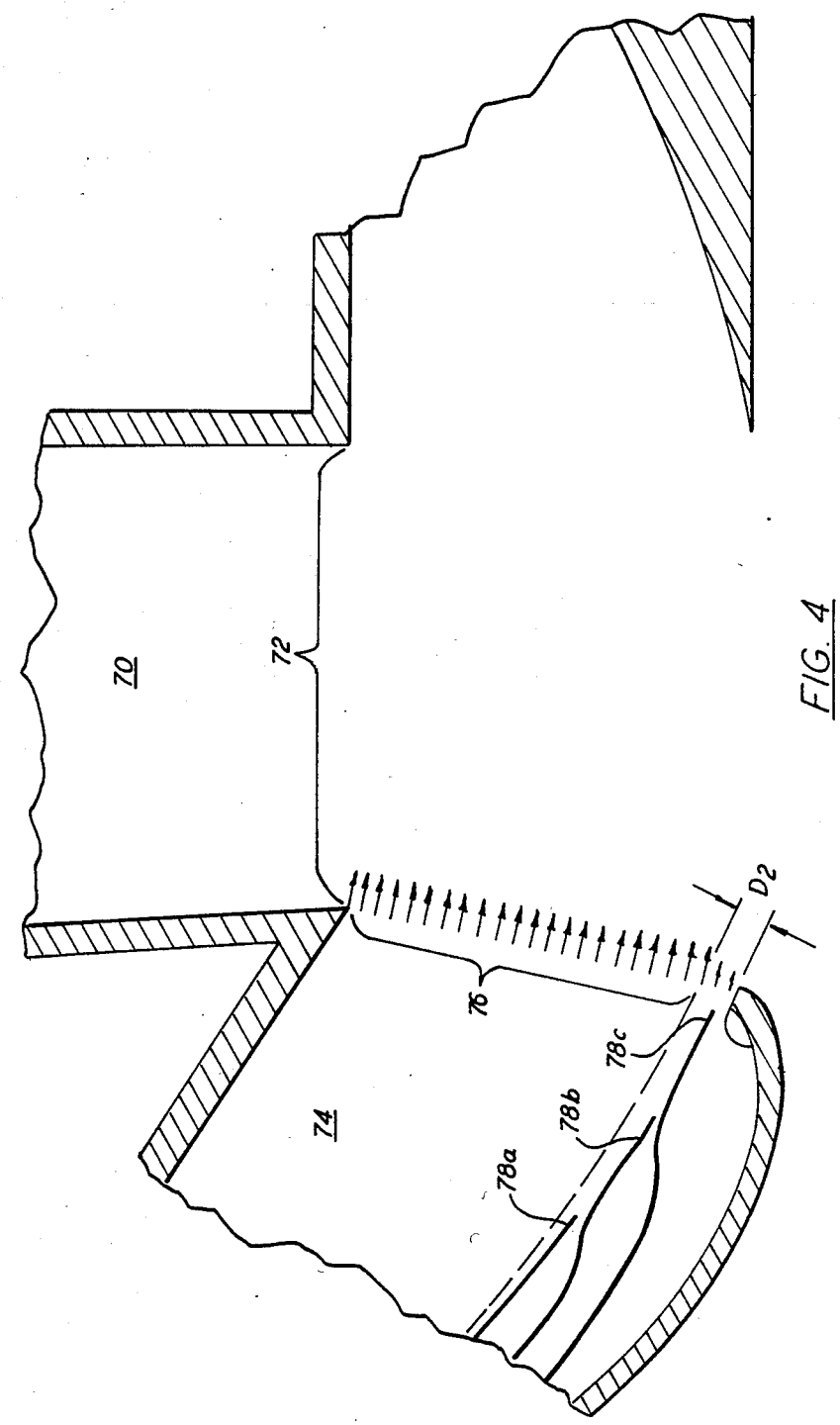

SHEAR LAYER CONTROL IN A FREE-VORTEX AERODYNAMIC WINDOW

DESCRIPTION

1. Technical Field

This invention relates to aerodynamic windows used in conjunction with a gas laser, and more particularly, to improved nozzles for generating a free-vortex aerodynamic window which reduces eddies and density variations in the optical path of the aerodynamic window.

2. Background Art

Windows are used in conjunction with high energy gas lasers to isolate the low pressure cavity from the atmosphere. The internal gas pressure of a gas laser is typically in the range of 1/150 to 1/10 atmosphere and a window must be provided to isolate the low pressure cavity from the atmosphere. Such a window must not affect laser energy passing therethrough. One of the more effective windows for a gas laser is the aerodynamic window which is formed by flowing a gas across the face of the aperture through which the laser beam is directed.

One such aerodynamic window is described in U.S. Pat. No. 3,973,218 issued Aug. 3, 1976 to C. Kepler et al for Single Nozzle Free-Vortex Aerodynamic Window, assigned to the same assignee as the present application. The single nozzle disclosed in this patent forms a gas flow across the aperture through which the output laser beam passes. This flow path allows a pressure differential to exist between the atmosphere and the low pressure region of the laser cavity. An opening on the opposite side of the aperture collects the flowing gases.

Also of general interest for their teachings of aerodynamic windows designed for isolating the low pressure cavity of a gas laser from the atmosphere are U.S. Pat. No. 3,873,939 issued Mar. 25, 1975 to R. Guile et al for Aerodynamic Window; No. 3,654,569 issued Apr. 4, 1972 to G. Hausmann for Aerodynamic Window; and No. 3,617,928 issued Nov. 2, 1971 to G. Hausmann for Aerodynamic Window for Gas Laser, all of which are assigned to the common assignee.

DISCLOSURE OF INVENTION

An object of the present invention is to provide an aerodynamic window for a gas laser which has an enlarged shear boundary layer at the upstream edge of the aerodynamic window to delay the onset of the large eddy shear layer structure and minimize the density fluctuations in the shear layer across the laser optical path.

An object of the present invention is to provide an aerodynamic window for a gas laser in which the thickness of the shear layer separating the low pressure cavity from the atmosphere is increased to lessen the intensity of the density fluctuations in the supersonic shear layer across the aerodynamic window.

A feature of the present invention is to add mass flow to the nozzle of an aerodynamic window for a gas laser by using a rigid porous medium along the sidewall of the nozzle through which a mass flow is injected.

Another feature of the present invention is to provide an aerodynamic window in which the nozzle surface for forming the supersonic flow has been particularly sized and shaped and particulate matter has been added to the surface for increasing roughness whereby the wall shear is increased and thence, the thickness of the boundary layer is increased.

The foregoing and other objects, features and advantages of the present invention will become more apparent from the following description of preferred embodiments and accompanying drawings.

BRIEF DESCRIPTION OF DRAWINGS

FIG. 2 is an enlarged view of just the nozzle portion of the embodiment shown in FIG. 1;

FIG. 3 is an enlarged view, in simplified form, depicting a second embodiment of the aerodynamic window according to the present invention; and FIG. 4 is an enlarged view, in simplified form, depicting a third embodiment of an aerodynamic window according to the present invention.

BEST MODE FOR CARRYING OUT THE INVENTION

Figure 1:
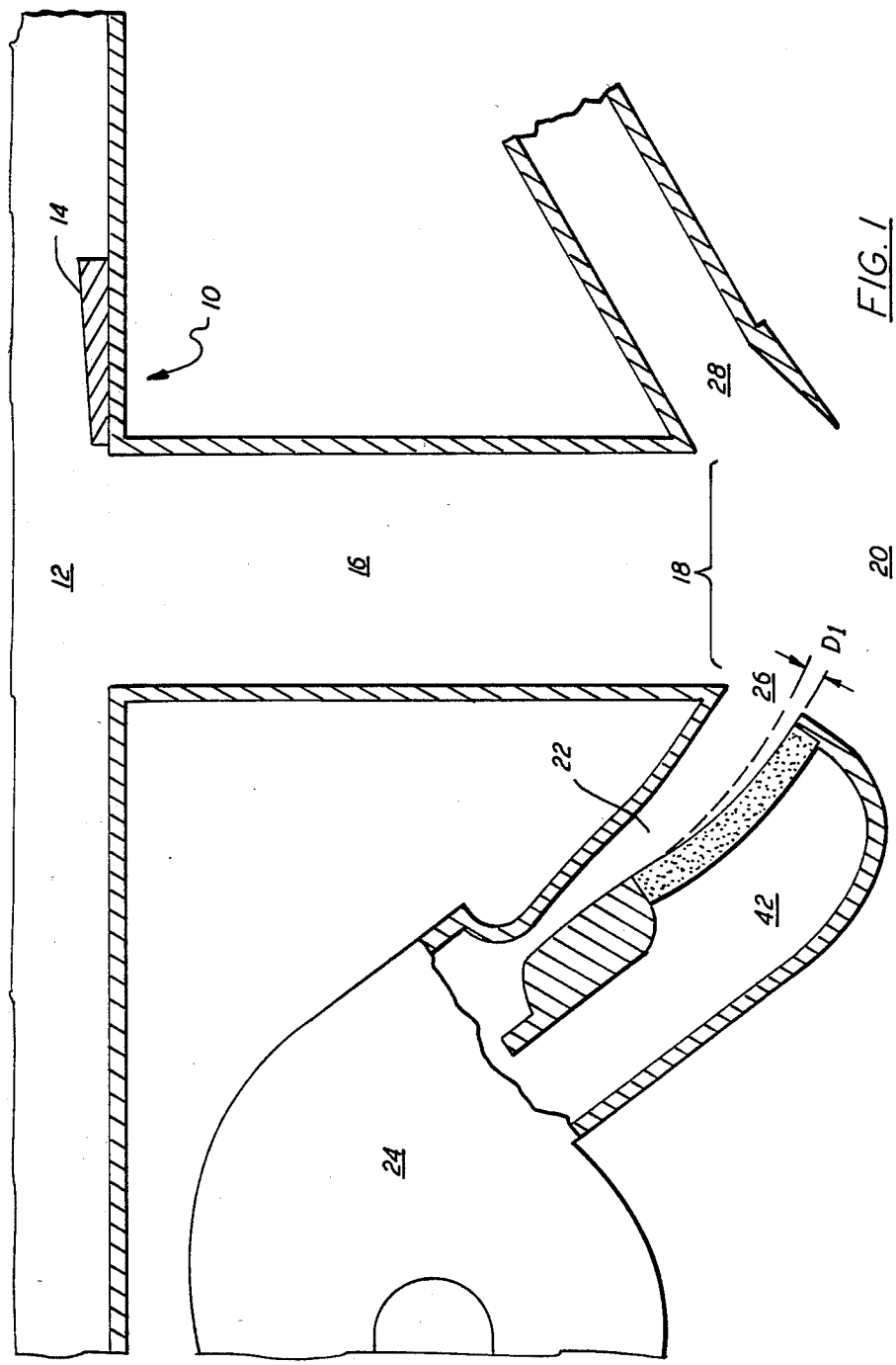
FIG. 1 is a view of one embodiment of the aerodynamic window according to the present invention depicted in relation to a laser.

Referring initially to FIG. 1, there is seen one embodiment of the aerodynamic window incorporating boundary layer control according to the present invention. A gas laser 10 of conventional design includes a laser cavity 12, in which the pressure must be maintained below ambient atmospheric pressure. The details and operation of a gas laser are generally known and play no part in the present invention. Such gas lasers typically include two mirrors, one of which is a mirror 14, for directing a laser beam from the cavity 12 through a passageway 16 to an exit aperture 18. An aerodynamic window according to the present invention is formed across the exit aperture 18 providing a barrier which is transparent to the laser beam but yet isolates the low pressure of the cavity from the ambient pressure of the atmosphere.

This novel aerodynamic window includes a nozzle conduit 22 which leads from a pump 24 to a nozzle opening 26 at the downstream end of the conduit 22. The flow from the nozzle opening 26 is received on the other side of the aerodynamic window in a downstream duct 28. The system could be either an opened loop system in which the gas flow from the duct 28 would be exhausted into the atmosphere, or a closed loop system. In the latter case (not shown) the gas flow would be redirected to an inlet for the pump 24 thereby conserving the gas used in the system.

As briefly mentioned hereinbefore, a problem with prior art aerodynamic windows is related to the large scale eddies which develop in the shear layers between the high velocity gas flowing across the cavity exit and the nearly quiescent gases of the laser cavity and the atmosphere. These eddies cause density fluctuations, the largest of which occur between the gas stream and the atmosphere. The degradation of beam quality due to eddy formations and density fluctuations is particularly significant for the high energy lasers having shorter wavelengths.

A particular feature of the novel aerodynamic window according to the present invention involves the positioning of a porous wall 40 near the sidewall of the nozzle conduit 22 adjacent the high pressure side of the gas stream. An auxiliary conduit 42 leads from the pump 24 to one side of the porous wall 40 for providing a continuous auxiliary flow of gas which is directed into the primary flow at the location of the porous wall. The injection of gas through the porous wall has the affect of increasing the supersonic shear layer width such that the development of large scale eddies in the shear layer adjacent to the atmosphere of the flow from the nozzle opening 26 is inhibited. Stated differently, the secondary gas flow extends the development length of the large scale eddies. The gas injection volume through 42 is chosen such that the large eddy development lengths for the shear layer thickness at 26 is greater than length 18.

Referring additionally to FIG. 2, there is seen an enlarged view of just the end portion of the nozzle of the aerodynamic window according to the present invention. As mentioned, the walls of the nozzle are contoured to obtain the free-vortex velocity and pressure distribution at the end of the nozzle. The construction details for one type of prior art nozzle can be obtained from the Kepler et al patent cited herebefore. A problem with known aerodynamic windows results from instability in the shear layer profile which can cause large eddy formation to exist in the boundary layer between the flowing supply gas and the atmosphere.

One feature of the present invention is based on the recognition that the most unstable wavelengths in typical shear layer velocity profiles occur according to the following equation:

$$\alpha_r = \pi \delta / \lambda \cong 0.5 \quad (1)$$

where
 $\delta$ is the velocity shear layer characteristic dimension, $U_o/(\partial u/\partial y)_{max}$,
 $\lambda$ is the wavelength of rapidly growing velocity disturbances in the shear layer,
 $\alpha_r$ is a dimensionless wave number of the velocity disturbance,
 $U_o$ is the velocity at the edge of the boundary layer,
 u is the velocity in the boundary and free shear layers, and
 y is the coordinate perpendicular to nozzle wall and shear layer.

Another feature of the present invention involves the recognition of the fact that small disturbances in the shear layer require approximately four wavelengths to grow to the magnitude where density fluctuations affect the optical characteristics of the laser beam. And thus, to prevent large eddy structure formations in the shear layer, the velocity profile at the nozzle opening should be formed such that the velocity shear layer characteristic dimension has a predetermined relationship to the length of the opening. Or, stated in mathematical terms, $$\frac{(\delta/2)}{L_2} > \frac{0.5}{2\pi} \cdot \frac{1}{4} \simeq 0.02 \quad (2)$$

It has further been found while this relationship holds true for subsonic shear layers, supersonic shear layers may require less initial shear layer momentum thickness due to the inherent lower disturbance growth rate.

In order to obtain the desired boundary layer characteristics at the nozzle opening, mass flow can be added along the nozzle wall to obtain the desired shear layer profile. The nozzle opening is expanded by a predetermined amount as well as adding a predetermined amount of mass flow to the boundary layer. This means that for a given nozzle configuration an aerodynamic window length, the shear layer thickness is optimized to produce the best quality laser beam for a given laser wavelength.

Now consider a simplified example, for a linear shear layer velocity profile at the nozzle opening, the wall has to be moved out by approximately distance $D_1$, and a volume of flow of approximately Q has to be added to the shear layer.

$$D_1 = 5/6\delta \quad (3)$$

$$Q = U\delta/3 \quad (4)$$

where Q is the flow volume per unit window length.

Simply stated, increasing the shear layer thickness as described above inhibits the growth of the large scale eddies in the free shear layer by increasing the length of formation beyond that of the aerodynamic window opening.

Referring next to FIG. 3, there is seen just the nozzle portion of a second embodiment of an aerodynamic window according to the present invention. In this second embodiment, the gas laser (not shown) directs a laser beam through a passageway 50 to the exit aperture 52 across which the aerodynamic window is formed to isolate the low pressure of the laser cavity from the ambient pressure of the atmosphere.

A nozzle portion 54 is similarly shaped as before and includes a pump (not shown) which directs air through a nozzle channel 54 to a nozzle opening 56. As before, a portion 58 of the sidewall of the nozzle is moved out by a distance $D_1$ to accommodate a larger opening at the nozzle opening 56 and to accommodate the increase in the thickness of the shear layer.

In this second embodiment shear layer thickness is created by roughening the surface along the portion 58 by, for example, fixedly attaching sand or other particulate matter to the surface of the wall with an adhesive or the like. As will be appreciated by those of ordinary skill for a boundary layer thickened by increase friction, the relationship between the required boundary layer thickness and the skin friction is defined by the following equation:

$$\theta = \int_0^{L_3} \frac{C_f}{2} dx \quad (5)$$

where
 $\theta$ is the momentum thickness of the shear layer,
 $C_f$ is the local skin friction coefficient,
 $L_3$ is the length of the roughened wall (portion 58).

This relationship might be better appreciated from the following example. If it is assumed that the length of the window aperture $L_2$ is approximately equal to the length of the roughened wall $L_3$ which is to increase our boundary layer thickness, it is then possible to identify a particular granular or particle size. When fixedly attached on the wall to be roughened, the composite effect of the particle is to create the desired increase in momentum thickness and hence the velocity shear layer characteristic dimension.

In order to obtain rough wall boundary layer thickness of $\delta$ in length $L_2$:

$$\frac{\delta/2}{L} \simeq 0.02 \quad (6)$$

$$\frac{\delta}{L_2} = 2\overline{C}_f = 0.04 \quad (7)$$

$$\overline{C}_f = 0.02 \quad (8)$$

In other words, an average friction coefficient $\overline{C}_f$ of 0.02 is required. This skin friction coefficient is 5 to 20 times the value of that of a smooth plate. A sand roughness equivalent height of 1–2% of $L_2$ is required. So, for example, if $L_2$ equals approximately two inches, an equivalent sand height roughness of 0.02 inch is required.

As will be appreciated by those of ordinary skill, other methods and structures for creating a comparable roughness on a wall could also be employed. For example, a series of fine rods, wires, pedestals, or similar friction enhancing objects could be positioned on, or protrude from, sidewall portion 58 and the boundary layer would be thickened in the manner above described.

Referring finally to FIG. 4, there is seen a third embodiment of a aerodynamic window in which the shear layer is thickened to modify the velocity profile. As before, a gas laser (not shown) of conventional design directs a laser beam through a passageway 70 and exit aperture 72. The aerodynamic window according to the present invention isolates the low pressure in the passageway 70 from the high pressure of the atmosphere.

The aerodynamic window includes a pressurized gas source (not shown) which directs a gas flow through a nozzle 74 to a nozzle aperture 76. The nozzle opening is expanded by a predetermined length $D_1$ as approximated in equation 3 above. A plurality of wall jets 78a, 78b, and 78c are located in the sidewall of the passageway 74, each having a separate and controllable gas source (not shown). Each nozzle 78 is designed to inject gas into the boundary layer with a fraction of the velocity of the gas flow stream in the passageway 74 thereby increasing the boundary layer thickness. For example, auxiliary gas is provided along the auxiliary passageway and nozzle 78a would be designed to exit approximately 75% of the free stream velocity, nozzle 78b exits 50% of the free stream velocity, and nozzle 78c exits 25% of the free stream velocity. As will be appreciated, the composite effect of this supplemental flow will be to produce the same displacement and shear layer thickness as was described heretofore in greater detail with respect to the previously described embodiments of the aerodynamic window.

Although this invention has been shown and described with respect to preferred embodiments, it will be understood by those skilled in this art that various changes in form and detail thereof may be made without departing from the spirit and scope of the claimed invention.

We claim:

1. An aerodynamic window for use with a gas laser, comprising:
    housing means in which said gas laser is positioned, including an exit aperture from which said laser beam passes;
    means including a duct for directing a high velocity gas flow across said exit aperture providing a barrier to isolate the cavity of said gas laser from the atmosphere; and
    means along said duct for increasing the thickness of the shear boundary layer so that eddies and density variations in the transparent window are minimized.

2. An aerodynamic window according to claim 1, wherein said means along said duct for increasing the thickness of said shear layer thickness is a porous wall through which an auxiliary gas flow is directed to increase the thickness of the shear layer.

3. An aerodynamic window according to claim 1, wherein said means for increasing the thickness of said shear layer is a plurality of particulate matter fixedly attached to said sidewall of said duct.

4. An aerodynamic window according to claim 1, wherein said means along said duct for increasing the thickness of said shear layer is one or more jets positioned along the sidewall of said duct for directing an auxiliary gas flow into said main flow stream.

* * * * *